United States Patent Office 3,451,848
Patented June 24, 1969

3,451,848
METHOD OF COATING MAGNET WIRE WITH A POLYTRIMELLITAMIDE
James R. Stephens, Gary, Ind., assignor to Standard Oil Company, Chicago, Ill., a corporation of Indiana
No Drawing. Filed Mar. 31, 1966, Ser. No. 538,966
Int. Cl. B44d 1/42
U.S. Cl. 117—213                                   5 Claims

ABSTRACT OF THE DISCLOSURE

The varnishing of wire having a coat of polytrimellitamide is accomplished by annealing the coated wire at an elevated temperature and then applying the varnish as a solution in a solvent. An improved process which allows a lower annealing temperature involves treating the annealed coated wire with acetone, ethanol or formic acid prior to the varnishing.

---

This invention relates to aromatic polytrimellitimides and their use in producing insulating and protective coatings on electrical wires and other surfaces, and more particularly, to the preparation of particular solutions of polymers and their use in producing solid, smooth, continuous coatings and magnet wire enamels which are resistant to solvent shock and consequently resist cracking or crazing of the enamel or coating.

The aromatic polytrimellitimide polymers are described in the Belgian Patent No. 650,967, granted Jan. 25, 1965, and have been shown to produce insulating and protective coatings and enamels which exhibit excellent dielectric properties and low weight loss upon exposure to heat. The coating is commonly prepared from solutions of polymers which are applied to wire and other surfaces and baked at temperature ranges of about 400° C. to convert a soluble polymer into its insoluble form. The usual solvents for such solutions have been organic polar solvents such as N,N-dimethylacetamide, N-methylpyrrolidone, and the like, and mixtures of these solvents, diluted with less expensive diluents, such as for example xylene.

While these solutions are capable of producing coatings with the above-described excellent properties, frequently, problems have been encountered when one attempts to varnish a magnet wire enamel coated with these polytrimellitamide polymers. When this magnet wire enamel is made into useful forms, such as coils in an armature or stator, etc., the deficiency is observed when one attempts to varnish it with a thermally resistant polyimide, polyamide, or polyamide-imide formulated in a highly organic polar solvent such as N-methylpyrrolidone, dimethylacetamide, and others. The deficiency is that the polytrimellitimide magnet wire must be annealed at about 250° C. before it becomes resistant to the solvent shock which cracks or crazes the enamel.

Therefore, one object of this invention is to reduce the relatively high annealing temperature of 250° C. It is believed that the high annealing temperature relaxes the tension which has a tendency to crack the magnet wire enamel. I have found that this problem encountered with the polytrimellitamide solutions can be substantially eliminated when the wire coil is given a solvent treatment in place of the high annealing temperatures. I have found that organic solvents will permit the magnet wire enamel to be annealed at temperatures below 200° C., preferably at 100-150° C. The preferred solvents are acetone, ethanol and formic acid. When the polytrimellitamide magnet wire is annealed at this lower temperature in conjunction with a subsequent solvent treatment, the resulting solid coating is smooth, continuous, and not cracked or crazed after the wire is varnished.

Particularly, the invention is directed to a method of preparing solid, smooth coatings from an aromatic polytrimellitamide polymer and to compositions suitable for the production of such coatings by utilizing organic solvents, particularly ethanol, acetone and formic acid, with other components of the system described in the aforementioned Belgian patent. The method includes annealing the polytrimellitamide magnet wire enamel at a temperature of 100 to 200° C.; 100 to 150° C. if acetone is to be used as a solvent. After the magnet wire has been annealed, it is soaked in the organic solvent, preferably acetone, ethanol or formic acid, for a period of about 8 to 16 hours at room temperature, preferably for 12 hours. After soaking, the magnet wire is dipped in a polytrimellitamide varnish, dissolved in a solvent, for example, N,N-dimethylacetamide or N-methylpyrrolidone, for 15 minutes, drained for 5 minutes, and then baked at about 150° C. for about 1 hour to convert the soluble polyamide-imide into the insoluble form. Suitable polymers are described in the Belgian Patent No. 650,979, granted Jan. 25, 1965.

The polytrimellitamide polymers may be described as polyamides having some polyimide linkages; said polyamides are capable, when heated, of conversion to the polyimide form. Such polyamides are high molecular weight polymeric compounds having in its molecule units of

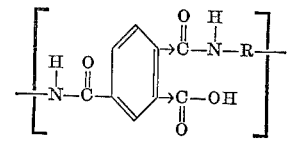

wherein → denotes isomerism and wherein R is a divalent aromatic organic radical. This organic radical consists of R′, which is a divalent aromatic hydrocarbon radical or two R′ divalent aromatic hydrocarbon radicals joined by stable linkages —O—, —CH$_2$—,

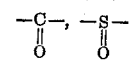

and —S—, as are in the groups —R′—O—R′—, —R′—CH$_2$—R′—,

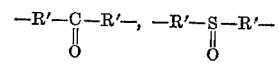

and —R′—S—R′—. The molecular weight of these polyamides is sufficiently high to produce upon heating a film forming polymer. Said amides are susceptible to condensation by heating to a polyamide-imide having to a substantial extent recurring units of

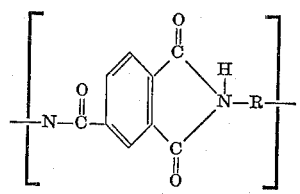

wherein R is a divalent aromatic organic radical in which in addition to hydrogen, nitrogen, sulfur and oxygen atoms can be attached to the carbon atoms. This organic radical consists of R′, which is a divalent aromatic hydrocarbon radical or two R′ divalent aromatic hydrocarbon radicals joined by stable linkages —O—, —CH$_2$—,

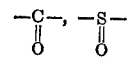

and —S—, as are in the groups —R'—O—R'—, —R'—CH₂—R'—,

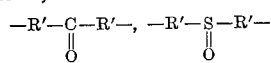

and —R'—S—R'—.

The polytrimellitamide polymers are advantageously prepared by reacting an acyl halide derivative of trimellitic anhydride and an aromatic primary diamine. Such polyamide-imides broadly include two types of useful polymeric products. One type, as indicated above, is the "polyamides," wherein the linking groups are probably predominantly amido although some may be imido and wherein the polymeric structure contains free carboxyl groups which are capable of further reaction. The other type, the polyamide-imides, are the polyamide polymer which has been subjected to further heat treatment and have no free carboxyl group but usually have a significantly high molecular weight. The polyamides, as formed, have from 0 to 45 percent imide linkages. Preferably, the percent imide linkages is controlled to about 20 percent or less in order to provide better solubility permitting easier handling of the product. The polyamide-imides, after heat curing, theoretically contain 50 percent amide linkages and 50 percent imide linkages.

The first type of the polyamides may be regarded as polyamides which are soluble in organic solvents and are capable of further reaction upon application of heat. They may be employed in solution, in high solids suspensions, or as powders in the production of coatings, laminates, films, fibers, molded products and as impregnating varnishes. The second type of polymers—the polyamide-imides—are much less soluble than the amides and when they have been heat cured they are generally insoluble in organic solvents and may be regarded as a cured end-product in the way of coatings, laminates, films, enamel-wire coatings and the like. The latter are characterized by resistance to solvents, by high termal stability and good electrical characteristics.

Infrared analyses of the soluble polyamides have shown optical densities as 6.02 N (amide carbonyl) of up to about 10–11 times those at 5.61 N (imide carbonyl) indicating the presence of a high amide content in comparison to the imide content of the polyamide. The infrared data also indicate the presence of carboxyl groups, although determination of their amount is hindered by the close position of the wave length of absorption for the imide carbonyl group.

Infrared analysis of some of the insoluble polymers shows an amide to imide ratio of about 1, indicating that the amide content of the soluble polyamide has been reduced to about 50 percent and the imide content has been increased to about 50 percent. The data also indicate that carboxyl groups are present, if at all, in only small amounts in the insoluble polymers.

The new polymeric products are prepared from an acyl halide derivative of trimellitic anhydride (1,2,4-benzene tricarboxylic acid anhydride), having at least one acyl halide group and that in the 4-ring position, which include derivatives such as the 4-acid chloride, 1,4- and 2,4-diacid chloride. The bromide and other reactive halide derivatives are also suitable.

The acyl halide derivative is reacted with an aromatic diamine having one or more aromatic rings and two primary amino groups. These aromatic diamines have the formula H₂N—R'—NH₂, H₂N—R'—O—R'—NH₂,

H₂N—R'—CH₂—R'—NH₂

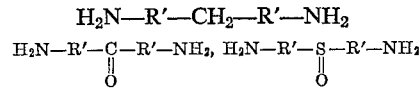

and H₂N—R'—S—R'—NH₂ wherein R' is a divalent aromatic hydrocarbon radical hereinbefore indicated. The aromatic content of the diamine provides the thermal properties in the polymer while the primary amino groups permit the desired imide rings and amide linkages to be formed in the polymer. Generally the aromatic diamine has from one to about four aromatic rings, advantageously from one to about two aromatic rings. The aromatic diamines having more than one aromatic ring may be further characterized as polycyclic aromatic compounds having two primary amino groups on an interconnected polycyclic aromatic nucleus. The aromatic rings may be interconnected by condensation, as in naphthalene or in phenanthrene-type structures, or may be bridged, either directly as in diphenyl diamines, or indirectly as, for example, two R' groups are joined with reactive stable inert linkages such as oxy, carbyl (carbon radical linked to 2 or less hydrogens), carbonyl, sulfonyl, and other relatively inactive groups such as the sulfide group as hereinbefore described. The carbyl groups may be illustrated by methylene, ethylene, substituted derivatives as 1,1-dimethylmethylene, and the like. Suitable nuclei (R' divalent aromatic hydrocarbon radical) include phenylene, naphthalene, anathrylene, naphthacenylene and the like; diphenylene, terphenylene, phenylnaphthalene, quaterphenylene and the like; and aromatic rings separated by oxy, carbyl, carbonyl, sulfonyl and thio groups.

The polymers of particular interest are those derived from p,p - methylenebis(aniline), m - phenylenediamine, and p,p-oxybis(aniline) because of their convenient preparation and highly satisfactory properties. Usually, the solution contains about 20 to 40–45 percent of the polytrimellitamide polymer. The resultant solution is used to produce a liquid film or coating on magnet wires to produce wire enamel and varnishes. The utility of this process is to prevent solvent shock which takes place with the polytrimellitimide magnet wire enamel. The solvent treatment of the wire enamel on organic solvents, preferably with acetone, ethanol or formic acid, produces unexpected results in that the tension of the polytrimellitamide magnet wire enamel is reduced and it can be annealed at lower temperatures. Useful organic solvents include acetone, ethanol, formic acid. It is unique to anneal the magnet wire at a temperature of about 100–150° C. when it is treated with the above-named solvents.

Another important step in our process is that the annealing-soaking sequence is critical. The wire enamel must be annealed and then soaked. If the coil is annealed after the soak, crazing still takes place.

This unique process is applicable to most organic polymers. It is useful for polyesters, polyurethanes, polyvinyl formals, etc. According to my process, the magnet wire coated with an organic polymer is stress-relaxed by a solvent soak treatment before varnishing with said organic polymer dissolved in an organic polar solvent. Good magnet wire enamels are obtained when the wire is coated with polyesters, polyurethanes, and polytrimellitamides. Representative organic polar solvents include N,N-dimethylacetamide, N-methylpyrrolidone, and the like, and mixtures of these solvents, sometimes diluted with a less expensive diluent, such as xylene.

The following examples illustrate some of the embodiments of this invention. It will be understood that these are for illustrative purposes only and do not purport to be wholly descriptive with respect to conditions or scope.

EXAMPLE I

Seven pounds of polytrimellitamide polymer prepared from p,p-methylenebis(aniline) was dissolved in 13 pounds of a solvent mixture of 25 percent (by weight) dimethylacetamide and 75 percent (by weight) N-methylpyrrolidone. The resulting solution had a viscosity of about 40 poises. The solution was used to coat #18 American Wire Gauge round copper wire in a 12-foot horizontal baking oven. The polytrimellitamide coated copper wire was then wound in 1-inch diameter coils at 10 to 100 turns and the coil was then annealed at a temperature of 150° C. for half an hour in an air oven. Then the annealed coil was soaked in acetone for a period of 8 to 16 hours. The soaked coil was then dipped in the dimethylacetamide-N-methylpyrrolidone polymer solution named above for 15 minutes. The coil was then removed and drained for a short period and then it was baked in an oven at 150° C. for one hour. After this procedure, both the original coating and the dip coating were obtained smooth, and without cracks.

EXAMPLE II

This procedure of Example I was repeated, but instead of acetone, ethanol was used for soaking. The coil was annealed at 200° C. for half an hour in an air oven. Then it was soaked in ethanol for 16 hours. The soaked coil was then dipped in the dimethylacetamide-N-methylpyrrolidone solution for 15 minutes. The coil was then removed and drained for a short period and then it was baked in a horizontal baking oven at 150° C. for one hour. After this procedure, both the original coating and the dip coating were obtained smooth, and without cracks.

EXAMPLE III

The procedure of Example I was repeated, but instead of acetone, ethanol was used for soaking. The coil was annealed at 200° C. for half an hour in an air oven. Then it was soaked in ethanol at 70 to 75° C. for 30 minutes. The soaked coil was then dipped in the dimethylacetamide-N-methylpyrrolidone solution for 15 minutes. The coil was then removed and drained for a short period and then baked in an oven at 150° C. for one hour. After this procedure, both the original coating and the dip coating were obtaintd smooth, and without cracks.

EXAMPLE IV

The procedure of Example I was repeated, but instead of acetone, formic acid was used for soaking. The coil was annealed at 200° C. for half an hour in an air oven. Then it was soaked in formic acid for 16 hours. The soaked coil was then dipped in the dimethylacetamide-N-methylpyrrolidone solution for 15 minutes. The coil was then removed and drained for a short period and then it was baked in an oven at 150° C. for one hour. After this procedure, both the original coating and the dip coating were obtained smooth, and without cracks.

I claim:

1. An improved process for varnishing magnet wire coated with a polytrimellitamide which comprises annealing said manget wire at a temperature below 250° C., soaking said annealed magnet wire in an organic solvent selected from the group consisting of acetone, ethanol, and formic acid for a period of at least 8 hours, dipping the soaked annealed magnet wire in a solution of a polytrimellitamide and baking said coil at a temperature of at least 100° C. for a period of at least half an hour.

2. An improved process for varnishing polytrimellitamide coated magnet wire which comprises annealing said magnet wire at a temperature below 250° C., soaking said annealed magnet wire in an organic solvent selected from the group consisting of acetone, ethanol and formic acid for a period of from about 8 to 16 hours at room temperature, dipping said annealed magnet wire in a polytrimellitamide varnish solution, said varnish solution consisting of a polytrimellitamide dissolved in an organic polar solvent selected from the group consisting of N,N-dimethylacetamide, N-methylpyrrolidone and mixtures thereof and baking said annealed magnet wire at a temperature within the range of 100–200° C. for a period of at least half an hour.

3. The process of claim 2 wherein the polytrimellitamide coated magnet wire is annealed at a temperature within the range of 100–150° C. and wherein said organic solvent is acetone.

4. The process of claim 2 wherein the polytrimellitamide coated magnet wire is annealed at a temperature within the range of 150–200° C. and wherein said organic solvent is ethanol.

5. The process of claim 2 wherein the polytrimellitamide coated magnet wire is annealed at a temperature within the range of 150°–200° C. and wherein said organic solvent is formic acid.

References Cited

UNITED STATES PATENTS

| 3,168,417 | 2/1965 | Smith et al. | 117—218 X |
| 3,342,768 | 9/1967 | Chalmers | 117—128.4 X |
| 3,342,774 | 9/1967 | Hoegger | 117—128.4 X |
| 3,361,589 | 1/1968 | Lindsey | 117—47 X |

ALFRED L. LEAVITT, Primary Examiner.

C. K. WEIFFENBACH, Assistant Examiner.

U.S. Cl. X.R.

117—49, 128.4, 218, 232